(12) United States Patent
Egelandsdal

(10) Patent No.: US 6,554,526 B1
(45) Date of Patent: Apr. 29, 2003

(54) FASTENING DEVICE

(75) Inventor: Einar Egelandsdal, Stavanger (NO)

(73) Assignee: Laerdal Medical AS (NO)

( * ) Notice: Subject to any disclaimer, the term of this patent is extended or adjusted under 35 U.S.C. 154(b) by 94 days.

(21) Appl. No.: 09/690,686

(22) Filed: Oct. 17, 2000

(30) Foreign Application Priority Data

Oct. 20, 1999 (NO) .............................. 99 5114

(51) Int. Cl.[7] .......................... F16B 37/08; F16B 37/14
(52) U.S. Cl. ....................... 403/294; 403/297; 403/326; 403/357; 403/376; 403/DIG. 11; 403/DIG. 12; 403/DIG. 13; 403/DIG. 14; 411/339; 411/392; 411/508
(58) Field of Search ................................ 411/392, 338, 411/339, 508, 509; 403/294, 292, 297, 326, 329, 345, 355, 356, 353, 358, 359.4, 359.5, 359.6, 376, DIG. 11, DIG. 12, DIG. 13, DIG. 14

(56) References Cited

U.S. PATENT DOCUMENTS

| | | | | |
|---|---|---|---|---|
| 1,220,908 A | * | 3/1917 | Thomas | 411/392 X |
| 2,586,556 A | * | 2/1952 | Mullikin | 411/392 X |
| 2,804,796 A | * | 9/1957 | Devine | 411/392 X |
| 3,065,660 A | * | 11/1962 | Puterbaugh | 411/392 X |
| 3,535,673 A | | 10/1970 | Maltais et al. | 339/95 |
| 3,893,211 A | | 7/1975 | Skinner | 24/221 |
| 3,918,130 A | | 11/1975 | Poe | 24/73 |
| 4,143,577 A | | 3/1979 | Eberhardt | 85/5 |
| 4,289,416 A | | 9/1981 | Birr et al. | 403/146 |
| 4,318,651 A | * | 3/1982 | Ragen | 411/392 |
| 4,338,755 A | * | 7/1982 | Chichester, Jr. et al. | 411/392 X |
| 4,437,286 A | * | 3/1984 | Maguire | 411/392 X |
| 4,616,455 A | * | 10/1986 | Hewison | 411/392 X |
| 4,762,453 A | * | 8/1988 | DeCaro | 411/392 X |
| 4,807,499 A | * | 2/1989 | Martinez | 411/392 X |
| 4,906,154 A | * | 3/1990 | Sheppard | 411/392 |
| 4,917,554 A | * | 4/1990 | Bronn | 411/392 |
| 4,947,502 A | * | 8/1990 | Engelhardt | 411/392 |
| 5,014,390 A | * | 5/1991 | De Gastines | 411/392 X |
| 5,061,137 A | * | 10/1991 | Gourd | 411/392 X |
| 5,102,276 A | * | 4/1992 | Gourd | 411/392 |
| 5,186,591 A | * | 2/1993 | Malks | 411/392 X |
| 5,486,079 A | * | 1/1996 | Martin et al. | 411/392 X |
| 5,628,601 A | * | 5/1997 | Pope | 411/392 X |
| 5,791,850 A | * | 8/1998 | Mundt et al. | 411/392 X |
| 5,802,794 A | * | 9/1998 | Robson | 411/392 X |
| 5,951,194 A | | 9/1999 | Faass et al. | 403/256 |

FOREIGN PATENT DOCUMENTS

| | | |
|---|---|---|
| DE | 35 21 680 C1 | 4/1987 |
| DE | 40 19 430 C2 | 6/1992 |
| EP | 0 877 566 A1 | 12/1998 |
| GB | 1 233 160 | 5/1971 |
| GB | 2 074 642 A | 11/1981 |
| JP | 4-95605 * | 3/1992 ................. 411/392 |

* cited by examiner

Primary Examiner—Christopher J. Novosad
(74) Attorney, Agent, or Firm—Holland & Knight LLP

(57) ABSTRACT

A fastening device for interconnecting two parts, comprising a longitudinally variable bolt designed to be inserted through a hole in a first part and engage the edge of an opening in a second part. The bolt is further configured to rotate about an axis that runs generally transversely across the longitudinal axis of the bolt, using the edge of the opening in the second part as a sliding track. The bolt defines a spring configuration intermediary of its ends so that the bolt may be compressed in the longitudinal direction and resumes its original length when it is released. The bolt is provided with grooves at opposing ends, which grooves extend generally transversely across the longitudinal axis of the bolt and are designed to engage the edge of the opening in the second part at diametrically opposed locations.

19 Claims, 5 Drawing Sheets

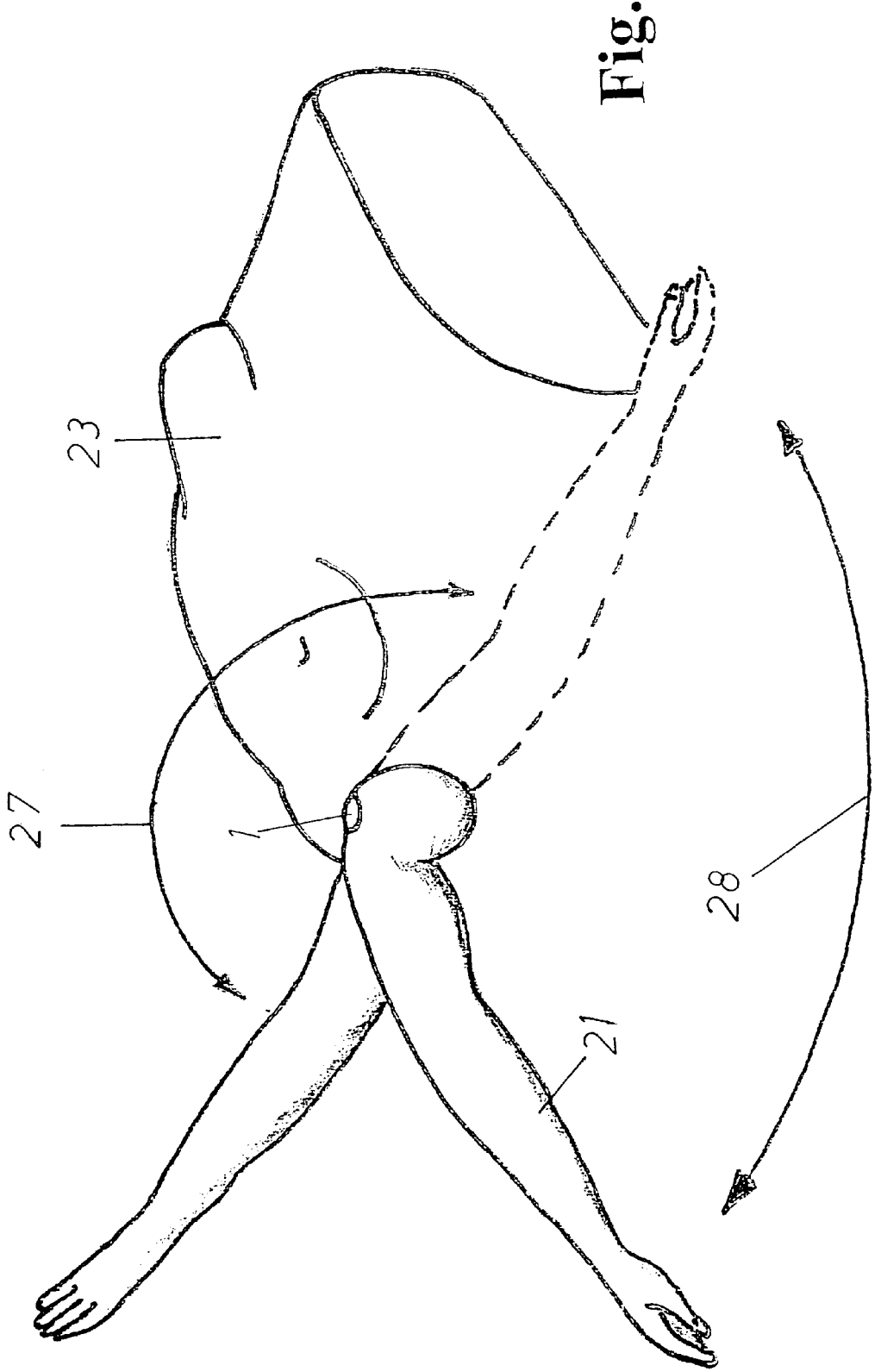

FASTENING DEVICE

This application claims the benefit of Norwegian Patent Application No. 1999 5114, filed Oct. 20, 1999.

BACKGROUND OF THE INVENTION

The present invention relates to fastening devices. Heretofore, numerous different types of fastening devices have been developed for securing two parts together in a wide variety of applications. Examples of such devices are found in U.S. Pat. Nos. 3,535,673; 3,918,130 and 4,143,577 wherein fasteners are disclosed designed to interconnect to plate parts in an essentially permanent relationship. Another type of fastening device is disclosed in German Patent No. 3,532,680 which is used to attach a rod to a plate in a manner so as to allow the rod to be rotated in one plane relative to the plate. There is a need, however, for a fastening device that can interconnect two parts in such a manner that the parts may be moved with respect to each other about more than one axis. An example of such a need is where the parts of a mannequin body are to be attached to the torso. In such a case, it is an essential requirement that the body parts be rotatable in all directions with respect to the torso, and at least to a certain degree about their own axis relative to the torso. Another application for such a fastening device is the transmission of gas by means of rods and lever arms where there is a need for multi-access movement in the connection between the rod and the lever arm. The present invention not only provides such a fastening device but also a device which provides for rapid connection and separation of the parts without the use of tools.

SUMMARY OF THE INVENTION

Briefly the present invention is directed to a fastening device for interconnecting two parts such that the parts can be moved with respect to each about more than one axis. The fastening device includes a longitudinally variable bolt configured to be inserted through a hole in a first part and engage the surrounding edge of an opening in a second part. The bolt is rotatable in the opening about an axis that runs generally transversely across the longitudinal axis of the bolt with the edge of the opening functioning as a sliding track. The bolt also defines a spring configuration intermediary of its ends so as to render the bolt longitudinally variable in that the bolt can be compressed in the longitudinal direction and resume its original length when released. The bolt is further provided with grooves at its opposing ends which extend generally transversely across the longitudinal axis of the bolt and engage the surrounding edge of the opening at diametrically opposed locations.

It is the principal object of the present invention to provide a fastening device for interconnecting two parts such that the parts could be moved with respect to one another about more than one axis.

It is another object of the present invention to provide such a fastening device which allows one rapidly to connect and disconnect the parts without the use of tools.

These and other objects and advantages of the present invention will become readily apparent from the following detailed description taken in conjunction with the accompanying drawings.

DESCRIPTION OF THE DRAWINGS

FIG. 7 shows an arm and a torso interconnected by means of the fastening device of the present invention.

DETAILED DESCRIPTION OF THE PREFERRED EMBODIMENT

Figure 1:
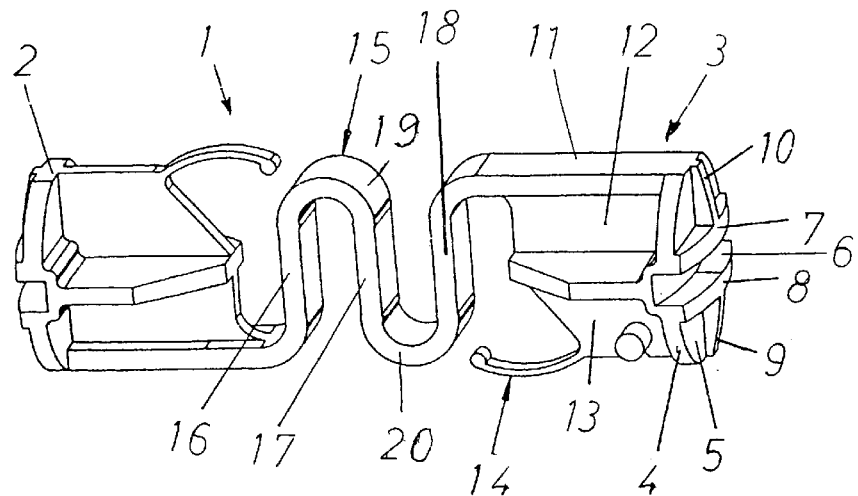
FIG. 1 shows a perspective drawing of a fastening device according to the present invention.
Figure 2:
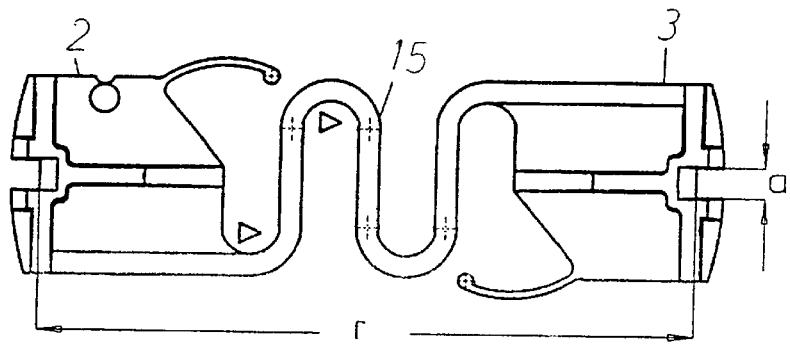
FIG. 2 shows a side view of the fastening device according to FIG. 1.
Figure 3:
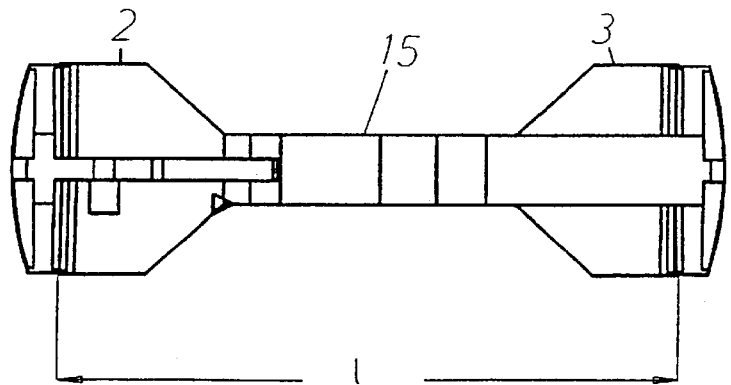
FIG. 3 shows the fastening device rotated through 90° relative to FIG. 2.

The fastening device of the present invention comprises a bolt 1 having a first head element 2 and a second head element 3. The head elements 2 and 3 are identical, and as such only head element 3 will be explained in detail. The head element 3 comprises a head part 4 having a generally circular disk 5. An engagement groove 6 is formed in the disk 5, which groove extends diametrically across the disk 5. Ribs 7 and 8 are provided on either side of the engagement groove 6 and rise above the surface of the disk 5. Further, ribs 9 and 10 extend at right angles from ribs 7 and 8.

Figure 4:
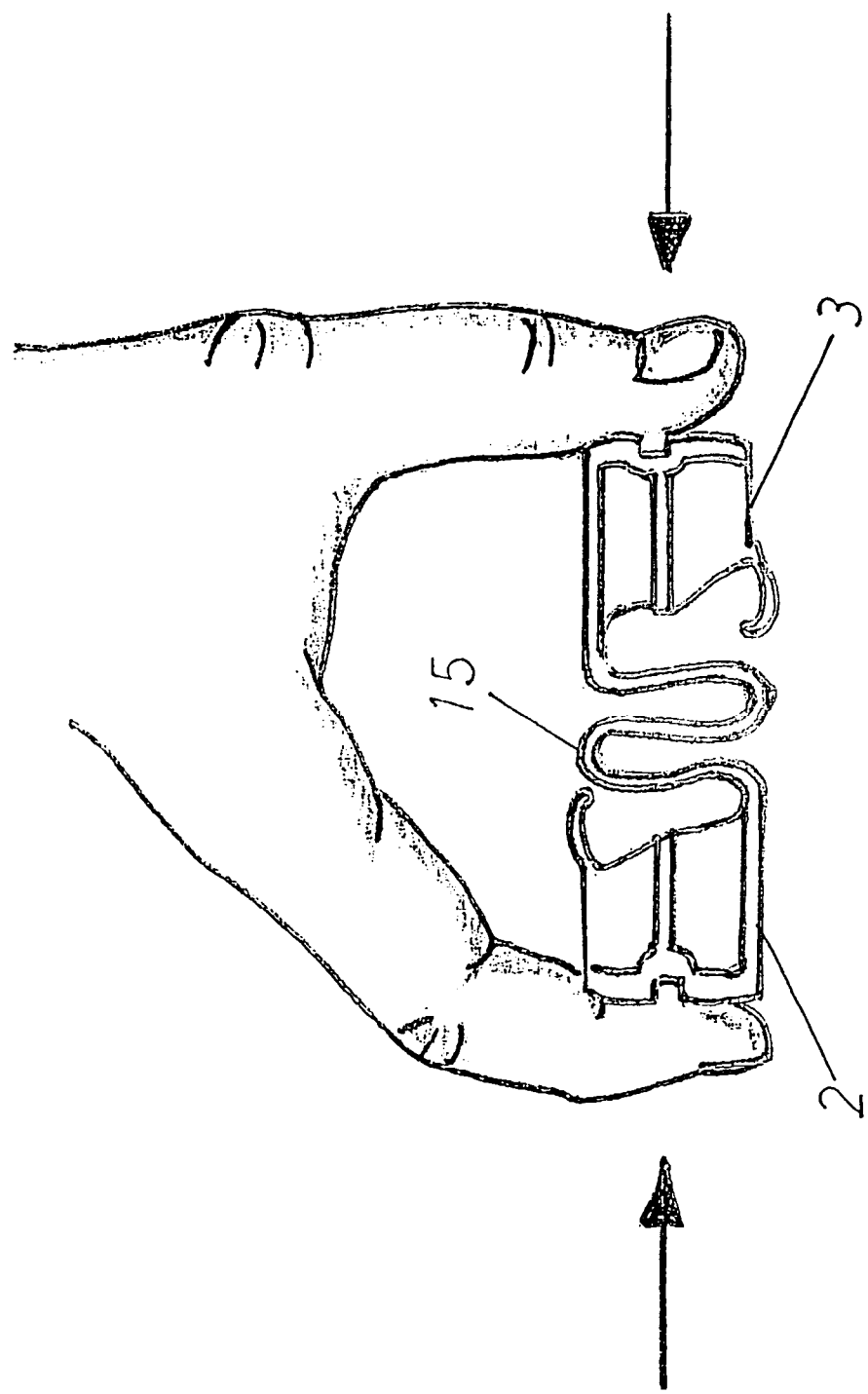
FIG. 4 shows the fastening device in the pressed condition.

A beam 11 extends from the outer edge of the disk 5 adjacent rib 10. A support rib 12 extends at right angles from the beam 11 and diametrically across the underside of the disk 5. A transversal rib 13 extends at right angles to the support rib 12 and parallel to the engagement groove 6 on either side of the support rib 12. The support rib 12 and the transversel rib 13 serve to reinforce the head part 4. A fin 14 projects from the opposite end of the support rib 12 from beam 11. Fin 14 extends in an arc outside of an imaginary cylinder that circumscribes the head part 4 of the head element 3 and the corresponding head part of the head element 2. An immediate member 15 extends between the beam 11 and the corresponding beam of the head element 2. This intermediate member has the general shape of an S, with three essentially parallel bars 16, 17 and 18 connected via U-shaped connectors 19 and 20. The intermediate member 15 is thus resilient so as to allow head elements 2 and 3 to be pressed together, as shown in FIG. 4. When the pressure is released, the intermediate member 15 will spring back to its original shape. In this manner, the length of the bolt 1 can be shortened by the application of an axial force.

Figure 5:
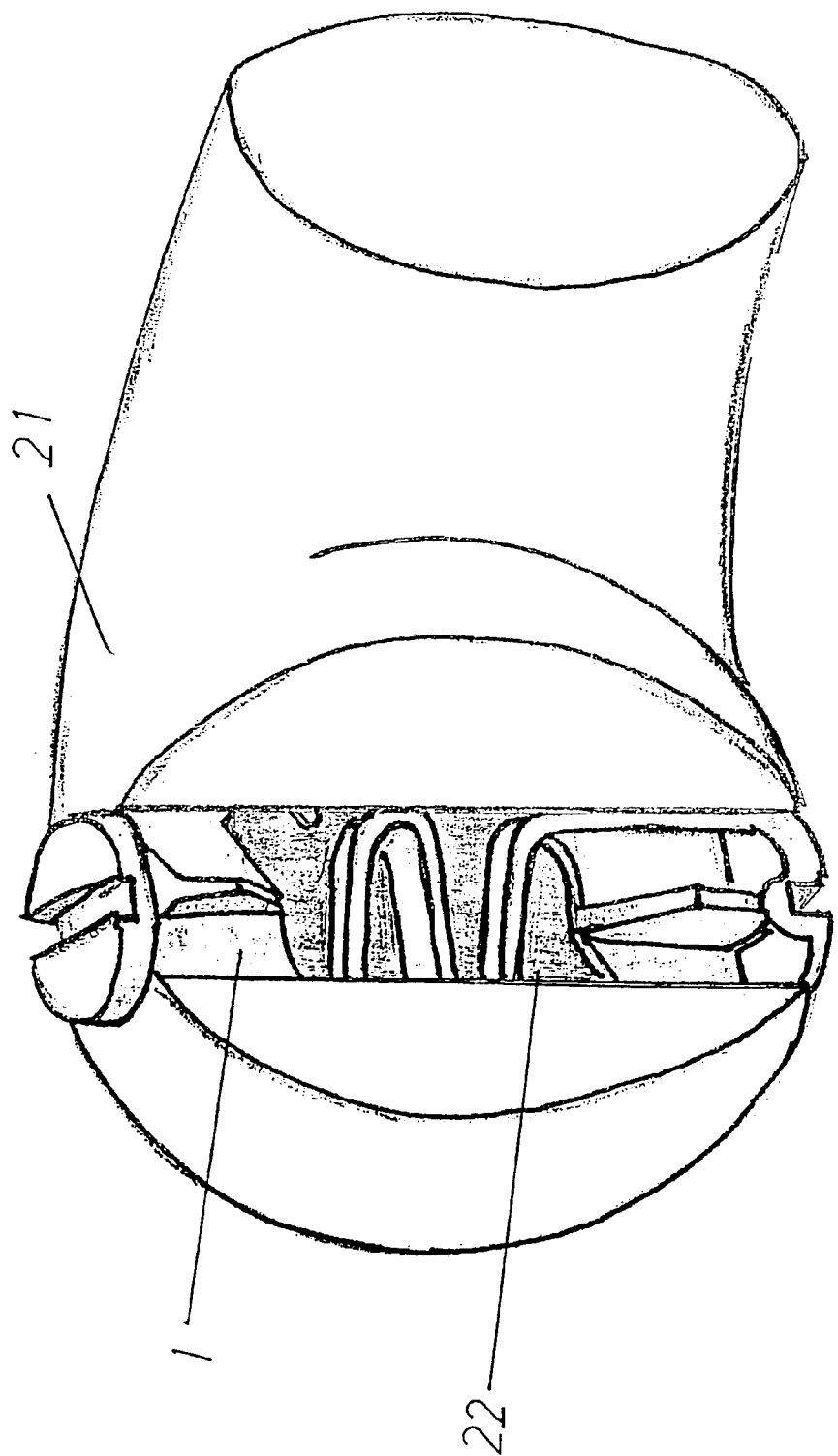
FIG. 5 shows a section through a part of a.mannequin arm with a fastening device of the present invention.

FIG. 5 shows an upper part of a mannequin arm 21. The arm has a through hole 22, which in the figure has been shown as cut through. The bolt 1 is placed in the hole. The lengths of the hole 22 and the bolt 1 are matched so as to leave the head elements 2 and 3 projecting slightly from the hole 22.

Figure 6:
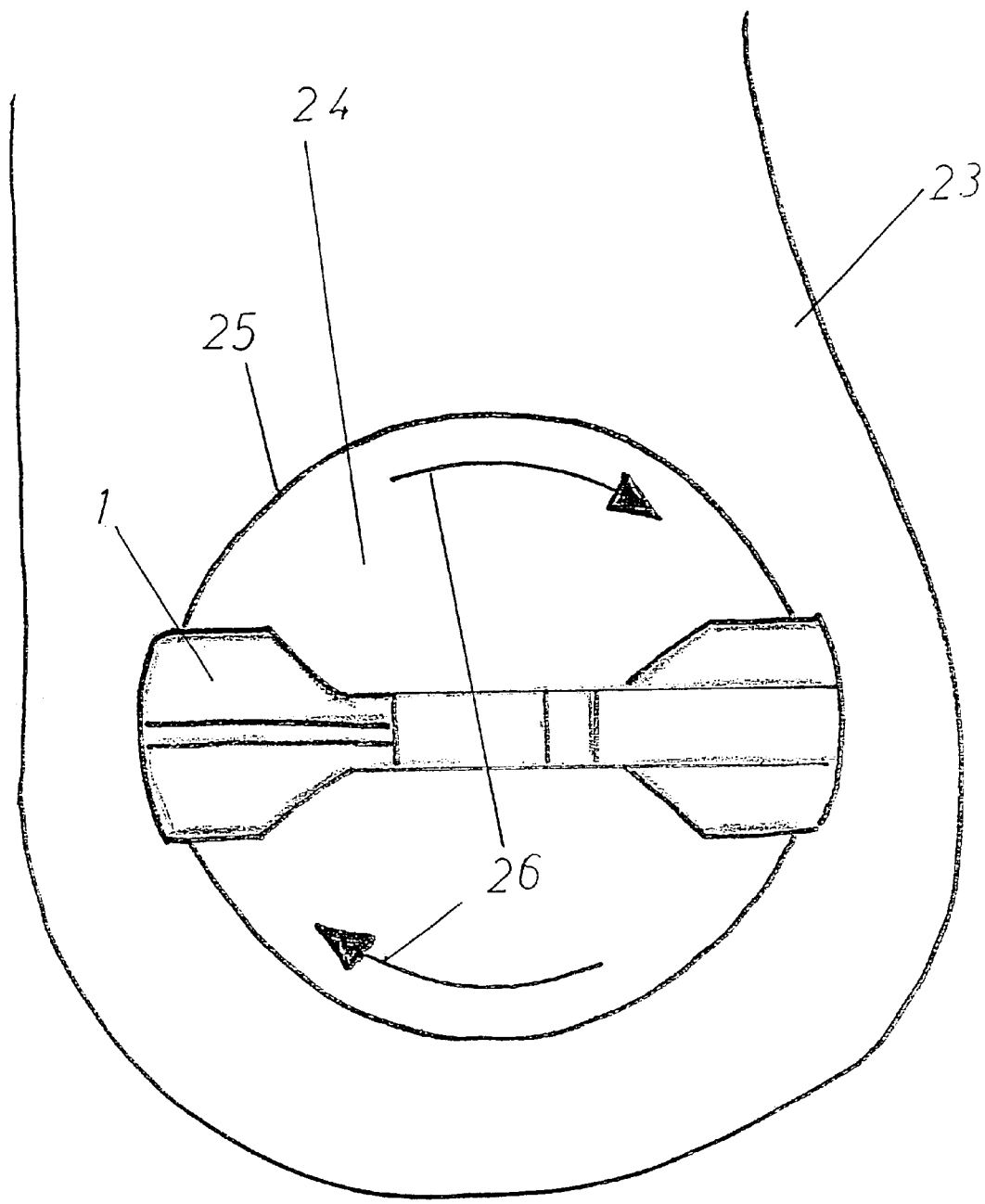
FIG. 6 shows the fastening device of the present invention positioned in a hold in the torso.

FIG. 6 shows a part of a torso 23 with an opening 24. The opening 24 has an edge 25 with a thickness somewhat less than the width of the groove 6. The bolt 1 is shown positioned in the opening 24. In order to make the bolt visible, the arm 21 has been removed; however it should be appreciated that the bolt also extends through the hole 22 in the arm 21. In order to place the bolt in the opening 24, the head elements 2 and 3 are pressed together so that the bolt may pass through the opening 24. The bolt may be positioned so as to align the grooves 6 of each head element 2 and 3 with the edge 25 of the opening 24 at diametrically opposed locations. Then the bolt is released and the grooves 6 engage the edge 25. The bolt 1 is thereby secured in place and arm 21 is attached about opening 24. As the opening 24 is circular, the bolt 1 may rotate about its transversal axis in the opening 24, as shown by arrows 26.

FIG. 7 shows how the arm 21 may move relative to the torso 23. Rotation in the direction of the arrows 26 in FIG. 6 corresponds to rotation in the direction of the arrow 27 in FIG. 7, and swiveling movement in the direction of the arrow 28 corresponds to a rotation of the arm 21 about the longitudinal axis of the bolt 1. The fins 14 serve to keep the bolt 1 fixed in the hole 22 to prevent the bolt from falling out after having been inserted. Alternatively, the bolt may be matched to the hole so as to make a close fit between the hole and the bolt. The bolt is preferably made from a plastic material, but may also be made from metal or other suitable material.

Various changes and modifications may be made in carrying out the present invention without departing from the spirit and scope thereof. Insofar as the changes and modifications are within the purview of the appended claims, they are to be considered as part of the present invention.

I claim:

1. A fastening device for interconnecting two parts so as to allow rotational movement of the first part relative to the second part, said device comprising a bolt member adapted to be inserted through a hole in the first part and engage the second part, said bolt member defining a longitudinal axis and extended end portions and being longitudinally variable along said axis and wherein said end portions define opposed part engaging surfaces, said surfaces being in planar alignment whereby upon said bolt member being inserted through the hole in the first part such that said part engaging surfaces protrude outwardly therefrom and engage and bear against opposed portions of the second part, the first part is secured to the second part so as to allow relative rotation of the first part with respect to the second part.

2. The fastening device of claim 1 wherein said bolt member defines a spring intermediary of said end portions whereby said bolt member is longitudinally compressible and extendable along its longitudinal axis.

3. The fastening device of claim 1 wherein said engaging surfaces each define a groove in one of said end portions, said grooves generally traversing said longitudinal axis of said bolt member and being in a parallel disposition.

4. A fastening device for interconnecting two parts so as to allow rotational movement of the first part relative to the second part, said device comprising a bolt member adapted to be inserted through a hole in the first part and engage the second part, said bolt member defining a longitudinal axis, extended end portions and bolt extension and retraction means intermediary of said end portions whereby said bolt member can be compressed and extended along said axis, and wherein said end portions define opposed part engaging surfaces, said surfaces being in planar alignment such that upon said bolt member being inserted through the hole in the first part and compressed, said extension and retraction means urges said end portions outwardly of the hole enabling said engaging surfaces thereon to engage and bear against opposed portions of the second part, securing the first part to the second part and allowing relative rotation of the first part with respect to the second part.

5. The fastening device of claim 4 wherein said bolt extension and retraction means comprises a spring integrally formed with said bolt member.

6. The fastening device of claim 4 wherein said engaging surfaces each define a groove in one of said end portions, said grooves generally traversing said longitudinal axis of said bolt member and being in a parallel disposition.

7. A fastening device for interconnecting two parts so as to allow rotational movement of the first part relative to the second part, said device comprising a bolt member adapted to be inserted through a hole in the first part and engage the second part, said bolt member defining a longitudinal axis, extended end portions and a spring intermediary of said end portions whereby said bolt member can be compressed along said axis, said end portions defining opposed part engaging surfaces, said surfaces being in planar alignment such that upon said bolt member being inserted through the hole in the first part and compressed, said spring urges said end portions outwardly of the hole enabling said engaging surfaces thereon to engage and bear against opposed portions of the second part, securing the first part to the second part and allowing relative rotation of the first part with respect to the second part.

8. The fastening device of claim 7 wherein said engaging surfaces each define a groove in one of said end portions, said grooves generally traversing said longitudinal axis of said bolt member and being in a parallel disposition.

9. The fastening device of claim 7 wherein said bolt member further defines at least one radial spring intermediary of said end portions, said radial spring being adapted to bear against said first part upon said bolt member being inserted through the hole therein for retaining the bolt member within the hole.

10. A fastening device for interconnecting two parts so as to allow rotational movement of the first part relative to the second part, said device comprising a bolt member adapted to be inserted through a hole in the first part and engage the second part, said bolt member defining a longitudinal axis, extended end portions, a first spring intermediary of said end portions whereby said bolt member can be compressed along said axis and at least one second spring intermediary of said end portions whereby said bolt member can be compressed transversely to said axis, said end portions of said bolt member defining opposed part engaging surfaces, said surfaces being in planar alignment such that upon said bolt member being inserted through the hole in the first part, said second spring bears against the first part to retain said bolt member within the hole and said first spring urges said end portions outwardly of the hole enabling said engaging surfaces thereon to engage and bear against opposed portions of the second part, securing the first part to the second part and allowing relative rotation of the first part with respect to the second part.

11. The fastening device of claim 10 wherein said engaging surfaces each define a groove generally traversing said longitudinal axis of said bolt member, said grooves being in parallel disposition.

12. The fastening device of claim 10 wherein said first spring comprises at least two bar portions traversing said longitudinal axis of said bolt member and at least one intermediate portion interconnecting said bar portions.

13. The fastening device of claim 12 wherein said engaging surfaces each define a groove generally traversing said longitudinal axis of said bolt member, said grooves being in parallel disposition.

14. The fastening device of claim 12 wherein said second spring comprises a pair of opposed resilient projections, each of said projections being disposed between said first spring and one end portion of said bolt member and extending a greater radial distance from said longitudinal axis of said bolt member than said end portions of said bolt member.

15. A fastening device for interconnecting two parts wherein a portion of the first part is disposed within an opening in the second part so as to allow rotational movement of the first part relative to the second part, said device comprising a bolt member adapted to be inserted through a hole in the first part and defining a longitudinal axis, extended end portions and a spring intermediary of said end portions whereby said bolt member can be compressed along said axis, each of said end portions defining a groove therein, said grooves being in parallel and planar alignment and traversing said axis for receiving therein opposed annular portions of the second part disposed about the opening therein such that upon said bolt member being inserted through the hole in the first part and a portion of the first part proximate the hole therein being inserted through the opening in the second part, said spring urges said end portions outwardly of the hole such that the grooves therein receive the opposed annular portions of the second part and bear against said annular portions so as to secure the first part to the second part and allow relative rotation of the first part with respect to the second part about an axis traversing said longitudinal axis of said bolt member.

16. The fastening device of claim 15 wherein said spring comprises at least two bar portions traversing said longitudinal axis of said bolt member and at least one intermediate portion interconnecting said bar portions.

17. The fastening device of claim 15 wherein said bolt member additionally defines a pair of opposed resilient radial projections, each of said projections being disposed between said spring and one of said end portions of said bolt member and extending a greater radial distance from said longitudinal axis of said bolt member than said end portions of said bolt member whereby said projections bear against the first part upon said bolt member being inserted through the hole therein to retain said bolt member within the first part.

18. The fastening device of claim 17 wherein said spring comprises at least two bar portions traversing said longitudinal axis of said bolt member and at least one intermediate portion interconnecting said bar portions.

19. A fastening assembly comprising a first part, a second part and a fastening device interconnecting said parts so as to allow rotational movement of the first part relative to the second part, said first part defining a hole extending therethrough, said second part defining an opening therein and a perimeter edge portion extending about said opening and wherein said fastening device comprises a bolt member defining a longitudinal axis, extended end portions and a spring intermediary of said end portion whereby said bolt member can be compressed along said axis, each of said end portions defining a groove therein traversing said longitudinal axis, said bolt member extending through said hole in said first part and projecting therefrom, said grooves receiving therein in a slid able fitment opposed portions of said perimeter edge portion of said second part whereby said first part is secured to said second part and is rotatable with respect to said second part about an axis traversing said longitudinal axis of said bolt member.

* * * * *